Oct. 2, 1928.

J. P. MADDEN 1,686,020

GEARING MECHANISM

Filed March 6, 1926

INVENTOR

James P. Madden.

BY R. S. C. Dougherty and A. B. Reavis

ATTORNEYS

Patented Oct. 2, 1928.

1,686,020

UNITED STATES PATENT OFFICE.

JAMES P. MADDEN, OF BETHLEHEM, PENNSYLVANIA, ASSIGNOR TO BETHLEHEM STEEL COMPANY.

GEARING MECHANISM.

Application filed March 6, 1926. Serial No. 92,727.

My invention relates to gearing of the unidirectional power-transmitting type, and more particularly to gearing which may be connected or disconnected by lateral movement of one of its members, and it has for its object to relieve teeth of one or more of the gears at the idle sides thereof and toward the tips in order to facilitate meshing.

In connection with auxiliary propulsion motors or engines for use in connection with locomotives, it is desirable to provide gearing mechanism of some kind so that the auxiliary motor or engine may be connected or disconnected with respect to a load-bearing axle. Owing to limitations of space and to simplicity of design, tumbler gearing has been used quite extensively for this purpose, the ordinary gear train including a driving gear carried by the motor or engine shaft, a tumbler gear constantly meshing with the driving gear and movable laterally with respect to the driven gear carried by the load bearing axle in order that it may be meshed or demeshed with respect to the latter gear. The tumbler gear or pinion may be moved laterally by any suitable means, that is, it may move into mesh with the driven gear wholly in consequence of the auxiliary propulsion motor engine being energized, or, it may move into mesh due to any suitable motor device, such as an air or steam cylinder. Gearing of this type is ordinarily so designed and arranged that, after the tumbler gear is meshed with the driven gear, the directions of rotation are such that the tumbler gear is forcibly maintained in mesh with the driven gear. Since the tumbler gear is movable laterally into mesh with the driven gear, it is desirable that the teeth thereof shall go into mesh between the teeth of the driven gear as easily as possible. The latter result is particularly desirable in view of the fact that the kinetic energy of the tumbler may be considerable while the tumbler gear is moving in a meshing direction. In order to facilitate meshing of the tumbler gear with the driven gear, to avoid tip clashing of the teeth of these gears as much as possible and to render the gearing more durable and certain in so far as meshing is concerned, I provide the teeth of the tumbler and driven or axle gears with their idle or non-power-transmitting sides relieved toward the tips thereof. This provides for wide spaces toward the tips of the teeth; and the surfaces at the relieved sides are preferably so curved as to facilitate meshing. Accordingly, therefore, it is the object of my invention to relieve the idle sides of gear teeth toward the tips thereof in order to facilitate meshing of a pair of gears including a laterally movable gear.

Apparatus made in accordance with my invention is illustrated in the accompanying drawings, forming a part of this application, in which.

Figure 1:
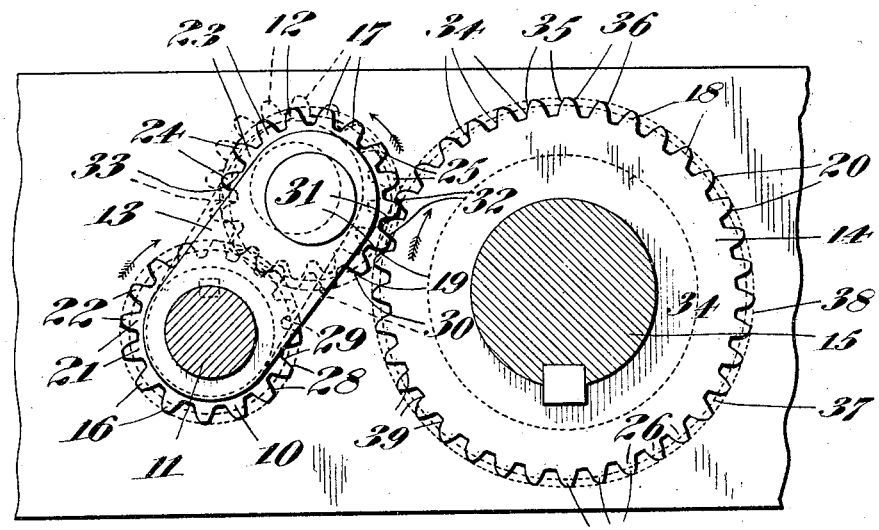
Fig. 1 is a view of gearing incorporating my improvement.
Figure 2:
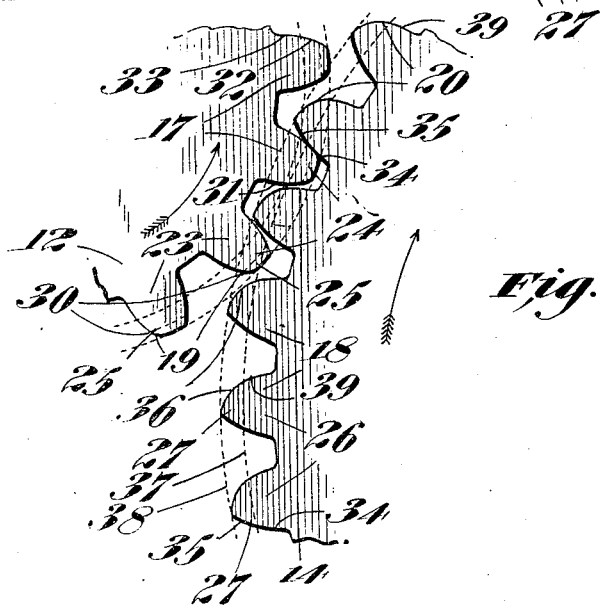
Fig. 2 is an enlarged detail fragmentary view of driven gear teeth.

In Fig. 1, I show a driving gear 10 adapted to be secured to any suitable driving shaft 11, for example, the crank shaft or driven shaft of a motor or engine. The tumbler gear or pinion 12 is preferably carried by a pivoted frame 13 and is maintained constantly in mesh with the driving gear 10. The tumbler gear 12 is adapted to move to meshed and demeshed positions with respect to the driven gear 14, the latter being carried by any suitable driven shaft or member 15, for example, a load-bearing axle of a railway vehicle.

The tumbler gear 12 may be moved in any suitable manner in order that it may be meshed with the driven gear 14, and it will be noted that the directions of rotation are such that, after the tumbler gear is meshed with the driven gear, such tumbler gear will be forcibly maintained in mesh with the driven gear. It will also be apparent that, assuming the driving gear 10 to come to a stop and the axle gear to continue to rotate, the axle gear will tend to kick the idler or tumbler gear 12 out of mesh therewith.

Referring to the driving gear 10, it will be noted that the teeth 16 thereof are of symmetrical or standard outline while the teeth 17 and 18 of the tumbler gear and of the driven gear, respectively, are relieved at sides thereof in order to facilitate meshing of the tumbler gear 12 with the driven gear 14. Referring to the meshing relation of the tumbler gear 12 and the driven gear 14, it will be seen that the teeth 17 of the tumbler gear are slightly rounded, at 19, at the rearward or non-power-transmitting surfaces of such teeth while the teeth 18 of the driven gear 14 are relieved at the forward sides or surfaces thereof, the relief being indicated generally at 20. Since the rearward surfaces of the teeth 17 are the surfaces which receive power from the driving gear 10, it is desirable that the rounding, indicated at 19, shall not be so great as to interfere with good action between the driving gear 10 and the tumbler gear 12.

The teeth 16 have symmetrical dedendum and addendum portions 21 and 22; the teeth 17 having symmetrical dedendum portions 23 and addendum portions 24, which are symmetrical except for tip portions 25 each of which is bounded laterally at one side by a rounded surface 19; and the driven gear teeth 18 preferably have symmetrical dedendum portions 26 and non-symmetrical addendum portions 27. The pairs of faces and flanks 28 and 29 of the teeth 16 are conjugate with respect to the pairs of faces and flanks 30 and 31 and 32 and 33 of the teeth 17, the rounding or curving of the faces 30 at 19 not being sufficient to disturb the conjugate relation to a substantial degree. Referring to the driven gear teeth 18, the rearward flanks 34 and the rearward faces 35 thereof are of normal outline and are conjugate to the forward faces and flanks 32 and 33 of the teeth 17. As already pointed out, the teeth 18 are rounded at the forward sides thereof generally as indicated at 20; and preferably this rounding or relief is effected by having the forward faces 36 extending from the pitch circle 37 to the addendum circle 38 inclined rearwardly to a greater extent than the forward inclination of the rearward faces 35, the flanks 39 at the forward sides of the teeth 18 preferably defining, with the rearward flanks 34, symmetrical dedendum portions 26. As shown on the drawings, the forward faces 36 preferably are curved rearwardly from the pitch circle 37 so as to meet or to intersect the rearward faces 35 at the addendum circle 38. It will, therefore, be seen that the driven gear teeth 18 are relieved in such a manner at the idle or forward sides thereof and the tumbler gear teeth 17 are relieved in such a manner at the idle or rearward sides thereof with respect to the driven gear teeth 18 that meshing of the teeth 17 with the teeth 18 readily takes place without substantial clashing, it not being possible for the ends or tips of the teeth to come into true abutting relation and there always being a tendency, with the design of teeth shown, for the teeth 17 to enter the spaces between the teeth 18, the rounded portions 19 of the teeth 17 and the curved faces 36 cooperating to produce this easy meshing.

While I have shown and described my invention particularly in connection with a system of tumbler gearing, it will be apparent to those skilled in the art that it is equally applicable to any situation where a pair of gears is used and one of the gears is shiftable in the plane of the other to connect and to disconnect the pair. Also, in some cases, it may be found that the small amount of relief of the tip portion of the movable gear may be unnecessary, the relief of the driven gear teeth at the forward or idle sides thereof contributing principally to the easy meshing.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and sesire to secure by Letters Patent is:

1. In uni-directional, power-transmitting gearing, the combination of a driven gear having teeth with symmetrical dedendum and non-symmetrical addendum portions and a gear having symmetrical teeth movable laterally of the driven gear to meshed and demeshed positions with respect to the latter, said gears having teeth adapted to intermesh and the idle faces of the teeth of the driven gear being relieved from the pitch circle to the tips in order to facilitate meshing of the laterally movable gear therewith.

2. In gearing mechanism, the combination of a driving gear, a driven gear, and a tumbler gear constantly meshing with the driving gear and movable to mesh and demeshed positions with respect to the driven gear, the teeth of the driving gear being symmetrical and the teeth of the tumbler gear being symmetrical except for outer parts thereof while the teeth of the driven gear are non-symmetrical, whereby the tumbler gear teeth may be readily meshed with the driven gear teeth, and the rearward faces and flanks of the driven gear teeth being conjugate to the forward faces and flanks of the tumbler gear teeth whereby power may be efficiently transmitted from the tumbler gear to the driven gear.

3. In gearing mechanism, the combination of a driving gear, a driven gear, and a tumbler gear constantly meshing with the driving gear and movable bodily to meshed and demeshed positions with respect to the driven gear, the teeth of the driving and tumbler gears having symmetrical addendum and dedendum portions except for outer parts of the dedendum portions of the tumbler gear teeth while the teeth of the driven gear have symmetrical dedendum portions and non-symmetrical addendum portions, the non-symmetrical addendum portions being provided by relief of the driven gear teeth from the pitch circle to the tips thereof and the rearward surfaces of the driven gear teeth being conjugate to the forward surfaces of the tumbler gear teeth.

In testimony whereof I hereunto affix my signature this 19th day of February, 1926.

JAMES P. MADDEN.